United States Patent [19]

Douglas

[11] Patent Number: 4,680,316
[45] Date of Patent: Jul. 14, 1987

[54] HOT APPLIED, EXPANDABLE SEALER

[75] Inventor: William A. Douglas, Richmond Heights, Mo.

[73] Assignee: United Technologies Automotive, Inc., Dearborn, Mich.

[21] Appl. No.: 787,343

[22] Filed: Oct. 15, 1985

[51] Int. Cl.$^4$ .............................................. C08J 9/00
[52] U.S. Cl. ...................................... 521/89; 521/92; 521/139; 521/909; 525/216
[58] Field of Search .................. 521/139, 89; 525/216

[56] References Cited

U.S. PATENT DOCUMENTS

| | | | |
|---|---|---|---|
| 2,901,774 | 9/1959 | Pooley | 18/53 |
| 2,964,799 | 12/1960 | Roggi et al. | 18/59 |
| 3,102,102 | 8/1963 | Weidner et al. | 525/216 |
| 3,111,496 | 11/1963 | Hunter | 525/216 |
| 3,154,604 | 10/1964 | McMillan | 264/45 |
| 3,242,110 | 3/1966 | Korpman | 525/216 |
| 3,256,132 | 6/1966 | Williams | 161/160 |
| 3,779,954 | 12/1973 | Wirth et al. | 260/2.5 R |
| 3,850,474 | 11/1974 | Welch | 296/31 P |
| 3,933,724 | 1/1976 | Mixell | 525/216 |
| 4,048,124 | 9/1977 | Ishikawa et al. | 525/216 |
| 4,205,103 | 5/1980 | Davis et al. | 427/373 |
| 4,228,245 | 10/1980 | Morgan | 521/139 |
| 4,252,906 | 2/1981 | Hosokawa et al. | 521/86 |
| 4,256,127 | 3/1981 | Hashimoto et al. | 521/139 |
| 4,256,850 | 3/1981 | Thorsud | 521/139 |
| 4,360,120 | 11/1982 | Samuel et al. | 524/494 |
| 4,456,706 | 6/1984 | Siedenstrang et al. | 521/139 |

*Primary Examiner*—Morton Foelak
*Attorney, Agent, or Firm*—Alan C. Cohen

[57] ABSTRACT

A hot applicable, heat expandable, thermosetting sealing composition particularly adapted for use in the automotive industry is disclosed. Such a sealant comprises a styrene-butadiene rubber mixed with conventional thermoplastic resin blowing agents, vulcanizing agent, oils and thickening agents wherein the addition of an activator selected from the family of sulfonamide materials results in a sealer which can be hot applied without causing it to prematurely blow or cross-link yet remain affixed to the component until such time as it is desired to blow and cure the sealant.

5 Claims, No Drawings

HOT APPLIED, EXPANDABLE SEALER

TECHNICAL FIELD

The invention relates to sealing compositions and are particularly adapted for use as acoustical sealants in the automobile industry.

BACKGROUND ART

The expandable sealants, which are used in automobiles to fill gaps and voids as well as improve the acoustical properties, have certain inherent problems. These materials at present must be applied at ambient temperatures so as not to prematurely cure or expand the sealant. In this condition, the sealant does not easily flow and is therefore contoured to a specific configuration prior to its application to the automobile. This results in certain instances, in a requirement that as many as twenty-two different sealant configurations must be formed and inventoried for one particular vehicle.

Another drawback to these "cold applied" sealants is that they do not adhere sufficiently to the vehicle and periodically are knocked off or moved from their original location by subsequent cleansing and priming tanks through which the vehicle must pass prior to the sealant being expanded and cured thereby securely positioning it in place. This results in contamination of the cleansing tanks and processes as well as an inferior automobile.

One attempt to overcome these drawbacks might be to apply the sealant hot. Such a hot applied pumpable sealant must not begin to cross link or blow at the temperatures at which the material is pumped as this will create problems in the pump as well as difficulty controlling the quality of the final sealant.

Therefore, what is needed in the art is in expandable sealant which is easily applied, will not be affected by the cleaning or painting processes, and does not activate prematurely at application temperatures.

DISCLOSURE OF THE INVENTION

The present invention discloses a pumpable, hot applied, thermosetting, expandable sealant having the following composition, about 10 to about 25 percent styrene-butadiene rubber, about 5 percent to about 20 percent of a thermoplastic resin, about 0.5 percent to about 3 percent of an accelerator activator, about 0.2 percent to about 0.75 percent vulcanizing agent, about 20 percent to about 60 percent filler, about 0.5 percent to about 2 percent of a blowing agent, about 4.0 percent to about 40 percent of a hydrocarbon oil or ester plasticizer or a blend of both and about 1 percent to about 10 percent by weight of a thickening agent. In addition, an accelerator selected from the sulfonamide family at concentrations of about 0.5 percent to about 3 percent by weight is present. The present composition is capable of being applied hot to a substrate, where upon cooling, the resin crystallizes and bonds securely to the substrate such that it is unaffected by the subsequent cleaning and priming operations performed on the automobile body assembly. The cooled composition is then expanded and cured upon exposure to heat in the paint curing ovens.

Another aspect of the invention is a method of applying an expandable, thermosetting sealant wherein the sealant composition is first heated to a temperature below its curing and blowing temperature but sufficient high to allow it to be pumped or hot melt applied onto the substrate after which the sealant is cooled. The cooled sealant is then heated and caused to expand and cure.

Other features and advantages of the present invention will become more apparent from the following detailed description of the preferred embodiment.

BEST MODE FOR CARRYING OUT THE INVENTION

A styrene-butadiene rubber or a blend of styrene-butadiene rubbers may be used to formulate this sealant, the preferred materials being Ameripol 1009 and Solprene 1205. It has been found that the best results occur if these two materials are present in the ratio of about 5 percent by weight Ameripol 1009 to about 15 percent by weight Solprene 1205. These materials are available from B. F. Goodrich Corporation of Akron, Ohio and Howsmex Company, of Akron, Ohio respectively.

Thermoplastic resins which may be employed are conventional aliphatic and aromatic hydrocarbon resins such as Wingtac 95, Wingtac 10, available from Goodyear Corporation, Akron, Ohio, Escorez 2101 (polymerized mixed polyolefins) and Escorez 5380 (hydrogenated hydrocarbons) available from Exxon Corporation, Houston, Tex., all typically present in amounts ranging from about 5 percent to about 20 percent by weight, with a preferred range being about 5 percent to about 10 percent. However, the preferred resin composition again is a mixture of about 8 percent of E-2101, which is a mixture of aromatic and aliphatic hydrocarbons, and about 8 percent by weight of polyterpene resin (Wingtac 10).

These thermoplastic resins should have melt temperatures ranging from about 32° F. (0° C.) to about 248° F. (120° C.) with the preferred range being about 158° F. (70° C.) to about 212° F. (100° C.) for best results. It is believed that melt temperature lower than 32° F. (0° C.) will result in a sealant which has poor tensile strength, tacky surfaces and poor cell structure, while those resins which melt temperatures above 248° F. (120° C.) will result in sealants having poor, coarse cell structures.

The filters, which are added to give body and structural stability to the sealer, are conventional materials such as calcium carbonate, and glass Microballoons ®. Typically, these filler materials will make up about 15 percent to about 50 percent by weight of the composition with about 20 percent to about 25 percent by weight being preferred.

Physical plasticizers are added to increase the flexibility of the sealer to a desired condition. Again conventional materials may be used such as phthalates, adipates, sebicates, phosphates, and aromatic, naphthenic, paraffinic oils with a paraffinic hydrocarbon oil and diisodecyl phthalate being preferred. The concentration of these materials will vary depending on the final properties desired and the application which the sealer is to be used, however, preferably between about 25 percent to about 35 percent by weight is used.

In order to have the sealer expand upon curing, blowing agents must be included in the formulation. Again these are conventional and typically will be present in amounts of about 0.5 percent to about 2 percent. The preferred chemical blowing agents are p,p'-oxybis-benzenesulfonyl hydrazide or azodicarbonamide, however it may also include p-toulene sulfonyl hydrazide, benzene sulfonyl hydrazide, p-toulene sulfonyl semicarbazide, and di-nitroso penta methylene tetramine types.

Additionally, conventional vulcanizing agents for example, amorphous sulfur, may also be used to advance the cure of the sealant. These materials are typically present at about 0.20 percent by weight to about 0.50 percent by weight with about 0.30 percent by weight to about 0.40 percent by weight being preferred. A further additive is a thickening agent such as an organoclay which is added to supply the desired rheology such as Benton SD-1, Benton SD-2 available from MC Chemical, Hightstown, N.J. 08520. Again this material is present in conventional quantities of about 1.0 percent by weight to about 10 percent by weight with about 4 percent to about 7 percent by weight being preferred.

A unique feature of the invention is that it has been found that through the addition of about 0.5 percent to about 3.0 percent of an accelerator selected from the sulfonamide group, one particularly preferred material being 4-morpholinyl-2-benzothiazole disulfide while others which may be used are sold under tradename MORFAX, DURAX, AMAX and VANAX NS, all available from R. T. Vanderbuilt of Norwalk, Conn. blowing and curing of the composition can be retarded at the high application temperature yet will not destroy its latent capability to cure and blow when desired. In addition, the material possesses sufficient crystallinity and rheology when cooled to remain where it has been placed throughout the subsequent processing step. In addition, it is important that accelerator activator be present in amounts saying from about 0.3 percent to about 3 percent by weight to start the accelerator curing the system. Conventional metal oxide activator may be used such as zinc oxide etc. either alone or in combination with organic acids such as stearic or oleic acid in this process. Such combinations are conventional and would be known to one skilled in the art.

The important feature of this invention is that the sealer composition is capable of flowing easily at elevated temperatures so that it might be applied to a surface through a pump or hot melt applicator. Any applicator may be used so long as the temperature generated by the pump does not cause the temperature of the sealant material to exceed the desired application temperature. The preferred pump is a recipricating one however, other types may be used. Typically the application temperatures will be about 130° F. (54.4° C.) to about 160° F. (71.1° C.). This allows the sealer to be placed on the substrate in a very plastic condition. The rubber composition chosen in formulating the sealant should be capable of a gelling or crystallizing upon cooling, when the temperature drops below about 100° F. (37.8° C.), these temperatures thereby imparting a degree of rheological integrity and elastomeric adhesiveness which will preclude contamination of the cleansing tanks or processes, i.e. cathodic electrodeposition primer tanks through which these materials will be exposed. It is also important that the curing agnets and accelerators not be activated at the application temperatures 130° F. (54.4° C.)-160° F. (71.1° C.) thereby sacrificing the latent reactivity of the sealant to expand and cross-link upon exposure to the higher temperatures (about 275° F. (135° C.) to about 375° F. (190.5° C.)) to which the sealant will be exposed in order to cure the composition.

An example of a typical formulation is disclosed below:

EXAMPLE

| General Description | Chemical Name | Wt. % |
| --- | --- | --- |
| Emulsion Grade SBR | Styrene-Butadiene Rubber | 4.94 |
| Solution Grade SBR | Styrene-Butadiene Rubber | 15.04 |
| Thermoplastic Resin | Aromatic/Aliphatic Hydrocarbon Resin | 8.01 |
| Thermoplastic Resin | Polyterpene Resin | 8.01 |
| Accelerator Activator | Stearic Acid | 0.38 |
| Accelerator Activator | Zinc Oxide | 0.99 |
| Thickening Agent | Organoclay | 5.49 |
| Activator | Antimony Oxide | 1.10 |
| Physical Plasticizer | Diisodecyl Phthalate | 5.16 |
| Accelerator | 4-Morpholinyl-2-benzothiazole disulfide | 1.70 |
| Chemical Blowing Agent | p,p'-oxybis-(benzenesulfonyl hydrazide) | 0.27 |
| Chemical Blowing Agent | azodicarbonamide | 0.60 |
| Accelerator Activator | Urea | 0.71 |
| Vulcanizing Agent | Sulfur | 0.38 |
| Physical Plasticizer | Paraffinic Hydrocarbon Oil | 24.15 |
| Filler | Glass Microballoons ® | 3.29 |
| Filler | Calcium Carbonate | 19.76 |

These sealants will find particular use in the automobile industry where roof bows require a filler and elastomeric cushion between the bow and the roof of the vehicle. During the manufacturing process, the sealant is hot melt applied to the roof bow, which may be done by a conventional pump or other applicator. The sealer is then cooled to below its gelation temperature wherein the sealant crystallizes. This crystallization supplies the sufficient rheology required to withstand any further processing i.e. cleansing washes, electrodeposition cycles, without dislodging the sealant. The roof bow and sealant are then primed and passed into a curing oven in which the temperature, typically about 300° F. or higher, is sufficient to cause the sealant to expand and cross-link.

Sealants of this design are the first of their kind which are thermosetting yet can be applied hot without causing excessive cross-linking or premature expansion to impair the further expansion and curing after the components are further processed. This quality eliminates the present need for having up to twenty-two individually contoured sealant components in stock for application on these structures. In addition, this process effectively eliminates any contamination of the processing tanks, i.e. electrodeposition tanks due to dislodgment of the sealant during processing and therefore also resulting in inadequate sealant being present in the final production item.

It should be understood that the invention is not limited to the particular embodiments shown and described herein, but that various changes and modifications may be made without departing from the spirit and scope of this novel concept as defined by the following claims.

I claim:

1. A hot applicable, pumpable heat expandable, thermosetting sealing composition particularly adapted for use in the automotive industry comprising: about 10 percent to about 25 percent by weight of styrene-butadiene rubber, about 5 percent to about 20 percent by weight of thermoplastic resins is an aliphatic or aromatic hydrocarbon resin having a melting point from about 32° F.(0° C.) to about 248° F.(120° C.), about 0.5 percent to about 3 percent by weight of an accelerator activator, to about 0.2 percent by weight to about 0.75 percent by weight of a vulcanzing agent, about 25 percent by weight to about 35 percent by weight of a plasticizer, about 20 percent by weight to about 60 percent by weight of filler, about 0.5 percent by weight to about 2 percent by weight of a blowing agent, about 1 percent to about 10 percent by weight of a thickening agent about 4 percent to about 40 percent by weight of an oil or plasticizer, said composition having a sulfonamide accelerator present at concentrations of about 0.5 percent to about 3.0 percent by weight, wherein the sealing composition can be applied to the surface of the structure to be sealed at an elevated temperature and after cooling to below about 100° F. can withstand the high pressure spraying of automotive cleansing tanks without being dislodged and will expand and cure upon exposure to paint curing processes.

2. The composition of claim 1 wherein the styrene-butadiene rubber is a blend of two polymers one being an emulsion grade styrene-butadiene rubber and the other a solution grade styrene-butadiene rubber wherein an emulsion grade SBR comprises about 5 percent by weight and a solution grade SBR is about 15 percent by weight.

3. The composition of claim 2 wherein the thermoplastic resin is a blend of aromatic and aliphatic hydrocarbons resins and polyterpene wherein the hydrocarbon resin is about 8 percent by weight and the polyterpene resin is about 8 percent by weight.

4. The composition of claim 3 wherein the activator is 4-morpholinyl-2-benzothiazole disulfide.

5. The composition of claim 4 wherein the accelerator activator is a combination of stearic acid and zinc oxide.

* * * * *